Patented July 12, 1932

1,866,856

UNITED STATES PATENT OFFICE

JOHN W. LEDEBOER, OF AMBLER, PENNSYLVANIA, ASSIGNOR TO AMBLER ASBESTOS SHINGLE & SHEATHING COMPANY, A CORPORATION OF PENNSYLVANIA

PANEL BOARD

No Drawing. Application filed January 22, 1930. Serial No. 422,543.

This invention relates to boards or slabs of insulating material composed of Portland cement and an inert material impregnated with an insulating compound to give a permanent dielectric strength to the board or slab.

The object of the invention is to provide such a board or slab that will be inexpensive in manufacture and durable in use, and having a fine smooth surface finish.

According to the process of this invention the slab is first formed and hardened and then impregnated with the insulating material. In the formation of the slab Portland cement is mixed with a relatively large amount of inert material, such as asbestos fibers, the asbestos fibers forming as much as 75% of the total amount of asbestos and cement. Preferably the Portland cement is not too quick setting, and the cement and fibers are mixed together with an excess of water and then run into a die having its lower surface of porous material to permit the excess of water to be forced out under pressure about 1500 pounds per square inch.

This die-formed slab in its wet condition is then removed and permitted to set and age or cure for ten days or longer, the edges being sprinkled at intervals with moisture to keep a reasonably uniform content of moisture in the slab while it is hardening and avoid irregular effects and warping. This hard cured slab has on one surface the marks of the filter or strainer used in the die to permit the escape of the excess water, while its opposite surface is comparatively smooth due to the contactive action of the press plate of the die.

After the setting and curing the slab is also somewhat irregular in shape and thickness, and the next step in the process is to grind the surfaces to substantially true parallelism with each other and to give very nearly the final thickness of the slab. Preferably this grinding is done with the slab in a horizontal position, and with its surface acted upon by a rotary grinder carrying segments of the grinding material working upon the cement asbestos mixture which is wetted during the grinding. The resulting ground surfaces are porous and of a dull finish. While they are substantially plane, the surfaces have a more or less rough appearance due to the exposed loose ends of the contained asbestos fibers at and near the surfaces, these exposed loose ends appearing at and over substantial portions of the surfaces.

After this grinding to accurate flat form the slab is vacuum-dried at a temperature of about 220° F. for about 12 hours, the vacuum being about 28″ so as to remove all excess moisture from the slab.

The dried slab is then cooled and sanded in a three-drum sander to give a finer, smoother surface finish, but without changing the general characteristics of the surface obtained as the result of the grinding operation.

The dried and sanded slab is then placed in the impregnating tank and redried at a temperature of 475° F. under 28″ vacuum and for a time varying from 2 to 14 hours, depending upon the thickness of the slab. All of the pores and fibers of the slab are thus entirely free of any excess moisture, and the slab is ready to receive the impregnating compound.

In impregnating the redried slab the compound in heated liquid form is run into the tank so as to submerge the slab, and this compound gradually permeates throughout the entire thickness of the slab, a pressure of eighty or ninety pounds per square inch being maintained on the impregnating material.

This impregnating material is preferably a mixture of equal parts of asphalt and wax tailings. The asphalt used in impregnating is known as saturating compound and has a melting point of approximately 120° F. and contains about 1% free carbon. The wax tailings have a melting point of 100° F. and contain less than one half of 1% free carbon. The time of impregnation varies with the different thicknesses from about 6 hours for ½″ thickness to 8 days for a 2″ thickness, a 1″ thickness taking about 48 hours and 1½″ thickness about 96 hours. The admixture of wax tailings reduces the viscosity and shortens the time for impregnation, and in general increases the efficiency of the operation.

At the end of the period of impregnation the slab is removed from the impregnating tank and cooled and belt-sanded to give it a very smooth surface, the slab itself being substantially black in color. In this condition the slabs are stored in stock and are removed as required from stock and cut to size and machined by boring and the like to final form as insulating boards and panel boards for electrical apparatus.

In order to give a very soft perfect final finish the board or panel in its final form is finely sanded and then puttied so as to cover any slight pits or depressions, and then lacquered with a black lacquer such for instance as Duco giving a beautiful deep, dull black surface on the final product.

The cement asbestos material up to the time of impregnation is quite porous and is intentionally maintained in this condition for impregnation. A relatively large amount of the material is the inert asbestos fibers, and care is taken in the pressing of the slab not to overcompact it so as to interfere with the desirable porosity, or compact the material excessively or render it impervious. Similarly in the subsequent grinding and sanding operations the porosity of the surface is maintained so that it is only the impregnation with the insulating compound that renders the slab impervious and waterproof and enables it to be finished smoothly and evenly, the final lacquering adding an impervious surface coating over the impregnating material as a base. The lacquer at the porous surfaces directly contacts with and forms a bond with the insulating material, and this gives a very firm bond of the lacquer on the impregnated cement asbestos material. Where the slab tends to be slightly brownish at the edges, this black surface lacquer completely covers the brown so that the entire slab is a deep velvety black in appearance, as well as smooth, solid and close-grained.

The process of forming the insulating board or panel herein disclosed constitutes the subject matter of my divisional application Serial No. 613,269 filed May 24, 1932.

I claim:

1. Insulating panel board and the like comprising a mixture of Portland cement and asbestos fibers with the cement set under pressure in porous condition from a mixture containing an excess of water, the amount of asbestos being in excess of the amount of said cement before setting and the surfaces of the board being smoothly ground and porous and uncompacted, and an impregnating insulating material throughout the board and at the porous ground surfaces thereof to render it solid and close-grained.

2. Insulating panel board and the like comprising a mixture of Portland cement and asbestos fibers with the cement set under pressure in porous condition from a mixture containing an excess of water, the amount of asbestos being in excess of the amount of said cement before setting and the surfaces of the board being smoothly ground and porous and uncompacted, and an impregnating insulating material throughout the board and at the porous ground surfaces thereof to render it solid and close-grained, said insulating material comprising a mixture of asphalt and wax tailings.

3. Insulating panel board and the like comprising a mixture of Portland cement and asbestos fibers with the cement set under pressure in porous condition from a mixture containing an excess of water, the amount of asbestos being in excess of the amount of said cement before setting and the surfaces of the board being smoothly ground and porous and uncompacted, an impregnating insulating material throughout the board and at the porous ground surfaces thereof to render it solid and close-grained, and a lacquer layer at the porous surfaces forming a bond with said insulating material.

JOHN W. LEDEBOER.